United States Patent
Kochanski et al.

(10) Patent No.: US 7,826,795 B2
(45) Date of Patent: Nov. 2, 2010

(54) METHODS AND APPARATUS FOR MITIGATING THE EFFECTS OF SOLAR NOISE AND THE LIKE ON A WIRELESS COMMUNICATION SYSTEM

(75) Inventors: Gregory P. Kochanski, Dunellen, NJ (US); Louis J. Lanzerotti, New Vernon, NJ (US); George E. Rittenhouse, Holmdel, NJ (US); David J. Thomson, Murray Hill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 809 days.

(21) Appl. No.: 11/612,920

(22) Filed: Dec. 19, 2006

(65) Prior Publication Data
US 2007/0093210 A1    Apr. 26, 2007

Related U.S. Application Data

(63) Continuation of application No. 09/850,946, filed on May 8, 2001, now Pat. No. 7,209,760.

(51) Int. Cl.
*H04B 15/00*    (2006.01)
*H04B 17/00*    (2006.01)

(52) U.S. Cl. ............ 455/63.1; 455/67.13; 455/501; 455/114.2

(58) Field of Classification Search .............. 455/524, 455/63.1, 67.11, 503, 506, 67.16, 134, 562.1, 455/62, 423, 424, 501, 505, 67.13, 114.2, 455/114.3; 398/41, 118; 342/203, 156, 123
See application file for complete search history.

(56) References Cited

U.S. PATENT DOCUMENTS

| | | | | |
|---|---|---|---|---|
| 5,640,442 A | * | 6/1997 | Fitzgerald et al. | 455/524 |
| 5,940,033 A | * | 8/1999 | Locher et al. | 342/378 |
| 6,304,760 B1 | * | 10/2001 | Thomson et al. | 455/503 |
| 6,678,176 B2 | * | 1/2004 | Lumsden | 363/95 |

* cited by examiner

*Primary Examiner*—John Lee
(74) *Attorney, Agent, or Firm*—Ryan, Mason & Lewis, LLP

(57) ABSTRACT

Techniques for reducing or eliminating effects of noise on a wireless communication system are provided. In one aspect of the invention, the technique comprises monitoring noise attributable to an interference source that may affect one or more components of the wireless communication system. The interference source being monitored is distant from the wireless communication system to the degree that noise arrives at the wireless communication system within a substantially point source-like angular range. For example, the noise may be attributable to the sun or tropospheric ducting. The technique then comprises initiating one or more operations, as a function of the monitored noise, to reduce or eliminate the effects of the noise attributable to the distant interference source at one or more of the components of the wireless communication system that are determined to be affected by such noise.

4 Claims, 9 Drawing Sheets

(A)

(B)

(C)

METHODS AND APPARATUS FOR MITIGATING THE EFFECTS OF SOLAR NOISE AND THE LIKE ON A WIRELESS COMMUNICATION SYSTEM

CROSS-REFERENCE TO RELATED APPLICATION(S)

This application is a continuation of U.S. application Ser. No. 09/850,946 filed on May 8, 2001, now U.S. Pat. No. 7,209,760 the disclosure of which is incorporated herein by reference.

FIELD OF THE INVENTION

The present invention relates to wireless communication systems and, more particularly, to methods and apparatus for mitigating the effects of solar noise and the like on wireless communication systems such that improved system performance may be realized.

BACKGROUND OF THE INVENTION

The sun is the largest source on Earth of non-anthropogenic noise in the hundreds of megahertz, MHZ, and the gigahertz, GHz, range. The usual measure of solar noise is in terms of solar flux units or sfu, where 1 sfu equals $10^{-22}$ watts per meter squared hertz or W/(m² Hz).

Solar radio bursts have been studied for many years, and they are believed to be created by gyrosynchrotron emission by energetic electrons in the sun's magnetic field. Data collected during the $20^{th}$ solar cycle in 1966-1978 suggests that large events occur perhaps a few times in a solar cycle, see, e.g., W. R. Barron et al., "Solar Radio Emission," Handbook of Geophysics and the Space Environment, A. S. Jursa, ed., Chapter 11 AFGL, USAF, 1985. Events of lesser magnitude are more numerous. A histogram of the distribution of the amplitude of events has been measured for the $20^{th}$ solar cycle, see, e.g., the above-referenced W. R. Barron et al., "Solar Radio Emission," but there is no reason to believe that the distribution is typical of other solar cycles. There is some evidence to indicate that other cycles, such as the $18^{th}$ when solar radio noise was discovered through its interference with radar in the Second World War, may have been worse. Statistics do not exist on the polarization of these bursts, and the changes with time of the polarization, if any.

Embedded within the radio bursts are often burst "spikes," see, e.g., A. O. Benz, "Millisecond Radio Spikes," Solar Physics, 104, 99-110, 1986; and H. Isliker et al., "Catalogue of 1-3 GHz Solar Flare Radio Emission," Astronomy and Astrophysics, 104, 145-160, 1994. Such spikes can reach amplitudes that are several orders of magnitude more intense than the broadband microwave continuum, see, e.g., the above-referenced H. Isliker et al., "Catalogue of 1-3 GHz Solar Flare Radio Emission." Spike bursts have durations of tens to hundreds of milliseconds, although detailed statistics do not yet exist. The physical processes producing the spikes are uncertain. One proposal, based on the intensity of the burst, is a maser-type process. The center frequencies of the spike bursts vary from spike to spike, and from large burst event to event. The bandwidth of the bursts is variable, ranging from a fraction of a percent to a few percent of the central frequency, see, e.g., A. Csillaghy et al., "The Bandwidth of Millisecond Radio Spikes in Solar Flares," Astronomy and Astrophysics, 274, 487-496, 1993. The bandwidth near a gigahertz may be, for example, a few megahertz to tens of megahertz.

However, while attempts have been made to study these solar bursts and embedded spikes over the years, numerous aspects relating to how they may affect various systems on earth and in space are not well characterized. This is the case with respect to wireless communication systems and how such a noise source may adversely affect communications in wireless systems.

SUMMARY OF THE INVENTION

We have recognized that there is a need for techniques for monitoring and mitigating the effects of interference sources that are so distant from a wireless communication system that noise from the source arrives at the wireless communication system within a relatively small or minimal angular range. In effect, the interference source may be considered point source-like in nature. For example, the noise may be attributable to the sun, tropospheric ducting, such as from an urban area, or other interference sources having similar characteristics.

Advantageously, by monitoring such noise and performing noise mitigation operations tailored to such a noise source, beneficial effects on communications in a wireless system may be realized, e.g., improved wireless system performance with respect to such a system operating under the same conditions but without the benefit of the invention.

In accordance with the principles of the invention, noise attributable to a distant interference source that may affect one or more components of the wireless communication system, e.g., such as the sun, tropospheric ducting, or like noise sources, is monitored. Thereafter, one or more operations are initiated, as a function of the monitored noise, to reduce and/or eliminate the effects of the noise attributable to the distant interference source at one or more of the components of the wireless communication system that are determined to be affected by such noise.

In an active monitoring embodiment of the invention, noise monitoring may include obtaining noise signals emitted by the distant interference source via one or more monitoring components, e.g., satellites, solar noise antenna and receiver sub-systems, deployed in association with the components of the wireless communication system, e.g., base stations, local and regional switches. One or more of the separate monitoring components may be co-located with the components of the wireless communication system or remotely located with respect to such components. While not intended to be limited thereto, the active monitoring approach may preferably be employed in the mitigation of solar noise.

In a passive monitoring embodiment of the invention, noise monitoring may include obtaining noise signals emitted by the distant interference source via two or more of the components of the wireless communication system. Thus, in such an approach, additional monitoring components are not needed, but rather the existing components of the wireless communication system may be used to perform the operation. While not intended to be limited thereto, the passive monitoring approach may preferably be employed in the mitigation of tropospherically ducted noise.

In accordance with the principles of the invention, a variety of noise mitigation operations may be employed to reduce or eliminate the effects of the noise attributable to the distant interference source at one or more of the components of the wireless communication system that are determined to be affected by such noise.

In a first embodiment, at least one mitigation operation may include implementing a handoff of one or more mobile user stations associated with a base station in the wireless communication system that is determined to be affected by the noise associated with the distant interference source to another base station in the wireless communication system that is determined to be at least less affected by the noise associated with the distant interference source.

In a second embodiment, at least one mitigation operation may include instructing one or more mobile user stations participating in existing calls and associated with a base station in the wireless communication system that is determined to be affected by the noise associated with the distant interference source to reduce, or at least keep constant, their respective transmit power levels.

In a third embodiment, at least one mitigation operation may include warning users of the wireless communication system of the effects or potential effects of the noise associated with the distant interference source.

In a fourth embodiment, at least one mitigation operation may include instructing one or more base stations to tolerate a higher frame error rate on sectors facing the distant interference source.

In a fifth embodiment, at least one mitigation operation may include instructing one or more base stations to lengthen their dropped call timeout value to allow a mobile user station more time to move to another cell at least less affected by the noise associated with the distant interference source.

In a sixth embodiment, at least one mitigation operation may include instructing one or more base stations to reduce the number of mobile users served by antennas facing the distant interference source by allowing fewer call initiations via those antennas.

In a seventh embodiment, at least one mitigation operation may include applying the one or more operations to a cluster of base stations determined to be similarly affected by the noise associated with the distant interference source. In such an embodiment, the shape and/or size of the cluster of base stations may be adapted based on the noise associated with the distant interference source.

In an eighth embodiment, each base station in the wireless communication system may be partitioned so as to have a predetermined set of angular bins and, further, each base station may be assigned to one of one or more clusters of base stations such that the affected coverage area and direction of the noise associated with the distant interference source is determined based on noise measurements calculated within the angular bins within each cluster.

In a ninth embodiment, at least one mitigation operation may include instructing one or more base stations to minimize antenna gain in the direction of the distant interference source. Further, the step of minimizing antenna gain in the direction of the distant interference source may comprise measuring relative phases and gains at a base station by nulling out signals from other nearby base stations.

DETAILED DESCRIPTION OF PREFERRED EMBODIMENTS

Figure 1A:
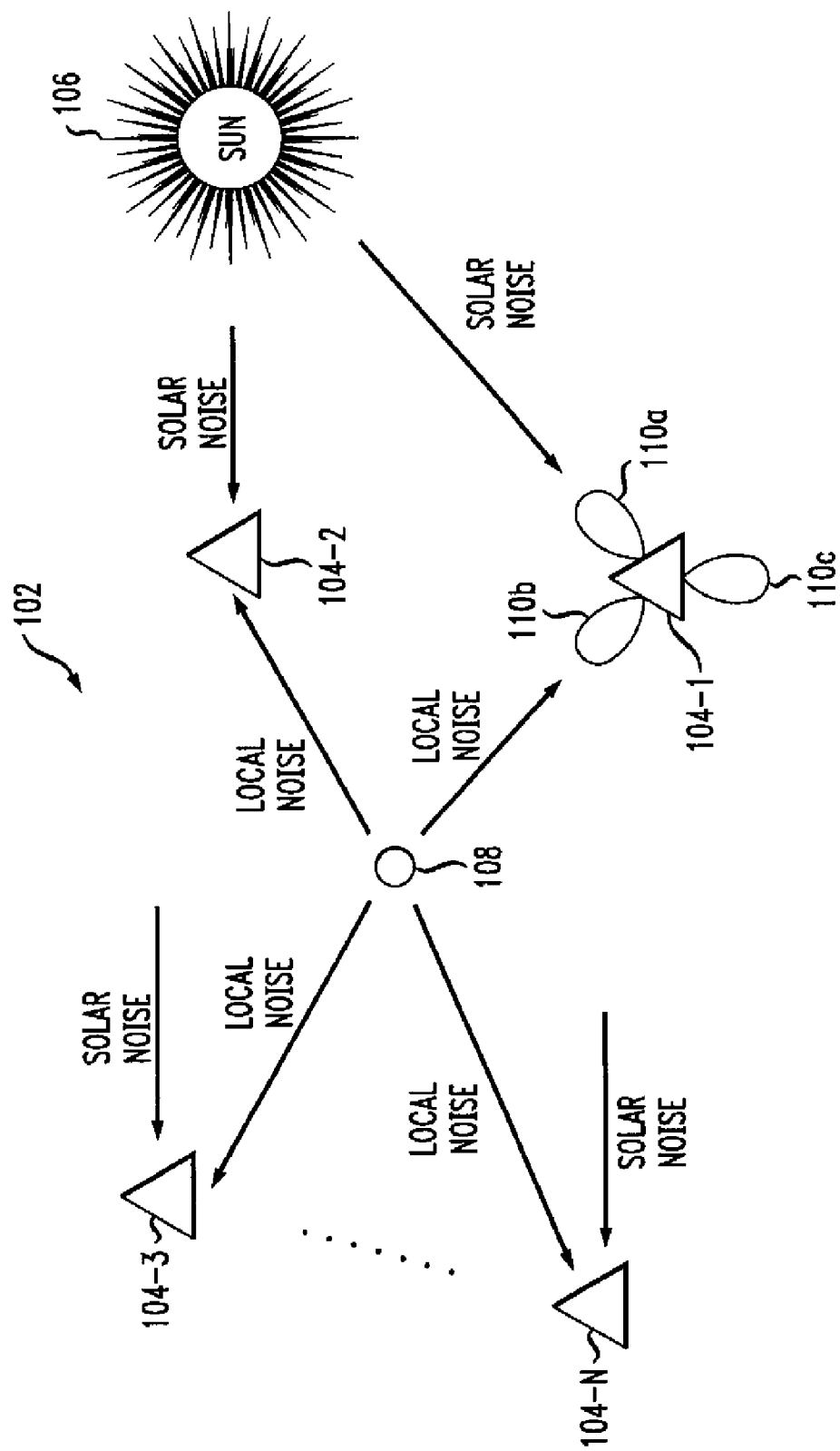
FIG. 1A is a block diagram illustrating the effects of more than one point-like noise source on a directional antenna associated with a base station in a wireless communication system.

Before presenting a description of various illustrative embodiments of the present invention, a brief discussion on some realizations that serve as a basis for the development of some of the inventive techniques described herein will be given.

In the frequency range of interest for wireless communications, e.g., 0.8-40 GHz, the radio noise from outbursts on the sun can vary over a wide range, reaching as much as $10^5$ sfu for some bursts at some frequencies, see, e.g., W. R. Barron et al., "An Atlas of Selected Multi-frequency Radio Bursts from the Twentieth Solar Cycle," AGFL-TR-80-0098, April 1980. This flux can be large enough to reduce the range of wireless systems, or even disrupt their operation during bursts which may last 10-15 minutes or even longer.

When calculating the coverage capacity of conventional cellular systems, a uniform thermal background noise is typically assumed. The power level of this noise at a typical ambient temperature is $-174+10 \log(B)$ dBm, where B is the signal bandwidth in hertz. The total receiver input noise is then given by this thermal noise plus the receiver noise figure. For a typical 5 MHZ bandwidth receiver with a noise figure of 8 dB, the total input noise power is $-99$ dBm. When there is more than one user, the multiple access noise between the users must also be included. This noise is dependent on the network deployment but is typically 10 dB higher then the thermal background and normally limits the total capacity of the system. However, during solar radio bursts, and especially during burst spikes, the solar noise power can become the dominant noise source and limit system performance, particularly if a receiver antenna is looking directly into the sun. This happens with the east-facing antennas of a base station during morning rush hours and with west-facing antennas in the evening. During such periods, the cell coverage would decrease and calls could be dropped. Also, an antenna in a satellite communication system could be similarly affected when the sun is near the line-of-sight between the antenna and the satellite.

In both the third-generation and IS-95 cellular systems, the multiple access scheme is CDMA or Code Division Multiple Access. Normally, the dominant interference in these systems is the multiple access noise. To minimize this noise, the base station continuously tries to reduce the transmit power of all the users within the cell. On average, as the transmit power is reduced, the interference and signal decrease together, maintaining a constant signal-to-noise ratio, while reducing power consumption and giving more headroom to those communications links that need it. This algorithm is well suited for interference-limited systems.

In the presence of a chain of burst spikes, the system noise level could increase to −95 dBm or more. Because the sun, with respect to a base station, is like a point source and the base station has a high-gain antenna, solar events will affect the handset, or mobile unit, to base station link more severely than the base station to handset link. With the current power control algorithm, the base station treats each user independently and would notice an increase in the frame error rate for each user. The base station would request the individually affected users to increase their transmit power. This correspondingly would increase the interference to neighboring cells. They in turn would request the users in those sectors to increase their respective transmit power. In this way, the system interference across the network would increase even though approximately only about one-third of the users are in antenna sectors actually facing the sun.

In an ideal system with infinite transmit power, this effect would not produce a decrease in system capacity or coverage. However, handsets have a maximum transmit power. When the system requests users to increase their power beyond the limit, they cannot, and their signal-to-noise ratio will drop. Eventually, users at the cell edges will be dropped from the system, resulting in a decrease in both system capacity and coverage.

Long duration solar radio bursts can pose important problems. We have included a 4 dB increase, corresponding to $10^3$ sfu, in solar activity into simulations of system capacity. Such an increase is not an uncommon broadband burst in the 1-4 GHz band. This sample burst raises the receiver noise from greater than or equal to −99 dBm to −95 dBm. Simulation results show that the 95 percent coverage capacity decreases by 4 percent. The decrease is small because the system is still interference limited. However, if the thermal noise were to increase another 4 dB, the system capacity would become noise limited and decrease substantially. We expect that these larger bursts will happen at least several times during a solar cycle. One of the largest bursts recorded in the last three solar cycles was the event of May 23, 1967, when the amplitude at approximately 1 G Hz was on the order of $2 \times 10^5$ sfu, or possibly even higher, see, e.g., J. P. Castelli et al., "The Solar Radio Patrol Network of the USAF and Its Application," Proc. IEEE, 61, 1307, 1973.

A relatively short burst spike could briefly raise the system noise to −90 dBm or above, which would likely result in loss of data sent to or from nearly all handsets during the spike. Presently, existing systems may be relatively insensitive to such short outages, as calls do not have a chance to timeout and the algorithm does not have a chance to run away. However, some problems are anticipated during handoffs from one cell to another, as a point source noise spike can confuse estimates of relative signal strength at different antennas. A chain of burst spikes, as occurs, can also lead to numerous dropped calls.

The present invention will be explained below in the context of illustrative embodiments for mitigating the effects of solar noise on a wireless communication system such that improved system performance may be realized. However, it is to be understood that the present invention is not so limited. Rather, as will be explained below, the methodologies of the invention may be more generally applied to mitigate the effects of any noise sources exhibiting similar characteristics as the sun on a wireless voice and/or data communication system, whether the communication system is terrestrial or extra-terrestrial as the case, for example, of a satellite-based communication system. This concept is generally illustrated in FIG. 1A.

More generally, it is to be understood that the techniques of the present invention are applicable to an interference source which is distant enough from the wireless communication system such that noise arrives at cells in an area of the wireless communication system within a small range of angles or minimal angular range. For example, the angular range may be approximately 15-25 degrees. However, it is to be understood that the invention is not intended to be limited to such an exemplary range, since such a small or minimal range may be different for a particular wireless communication system and/or a particular interference source. Thus, the interference sources being considered here are point source-like in nature. The range of angles is typically relative to the horizon, e.g., azimuthal, but the invention is not intended to be so limited. The sun and tropospheric ducting, as will be explained below, are examples of such distant interference sources.

As shown in FIG. 1A, a wireless communication system 102 includes a plurality of base stations 104-1, 104-2, 104-3, . . . , 104-N. It is to be understood that the system includes a multiplicity of mobile user stations or handsets, however, these are not shown in FIG. 1A for the sake of clarity. In addition to solar noise originated by the sun, denoted by reference numeral 106, the base stations are subjected to noise originated from a more local source 108 which also is distant enough from the base stations that the noise emanated thereby arrives at the base stations within a small range of angles. For example, the local source of noise may be a noise source that is further than the mean cell separation, e.g., ducting from a major urban area, cell phone calls from aircrafts, defective microwave ovens, industrial radio frequency heaters, etc. The reason why a base station may be susceptible to more than one such source of noise is due to the fact that most base stations in wireless communication systems employ a directional antenna for communication with other components of the system, for example, mobile user stations or handsets, as well as other base stations. Additionally, to compensate for the low power levels of mobile and portable units, the antenna gains of base stations are typically much higher than that of mobile units, a situation that could make the stations more sensitive to interference. This is illustrated in accordance with base station 104-1 where three different directional response lobes 110a, 110b and 110c are shown corresponding to three different directional faces of the antenna associated with the station. Thus, as is evident, a base station in a wireless system may be affected by one or more point-like sources of noise, e.g., solar noise and/or a local noise source. Therefore, while the following illustrative embodiments describe methodologies for mitigating the effects of solar noise, they may also be applied to the mitigation of solar noise and other like sources of noise, or solely to other point-like sources of noise besides the sun.

Figure 1B:
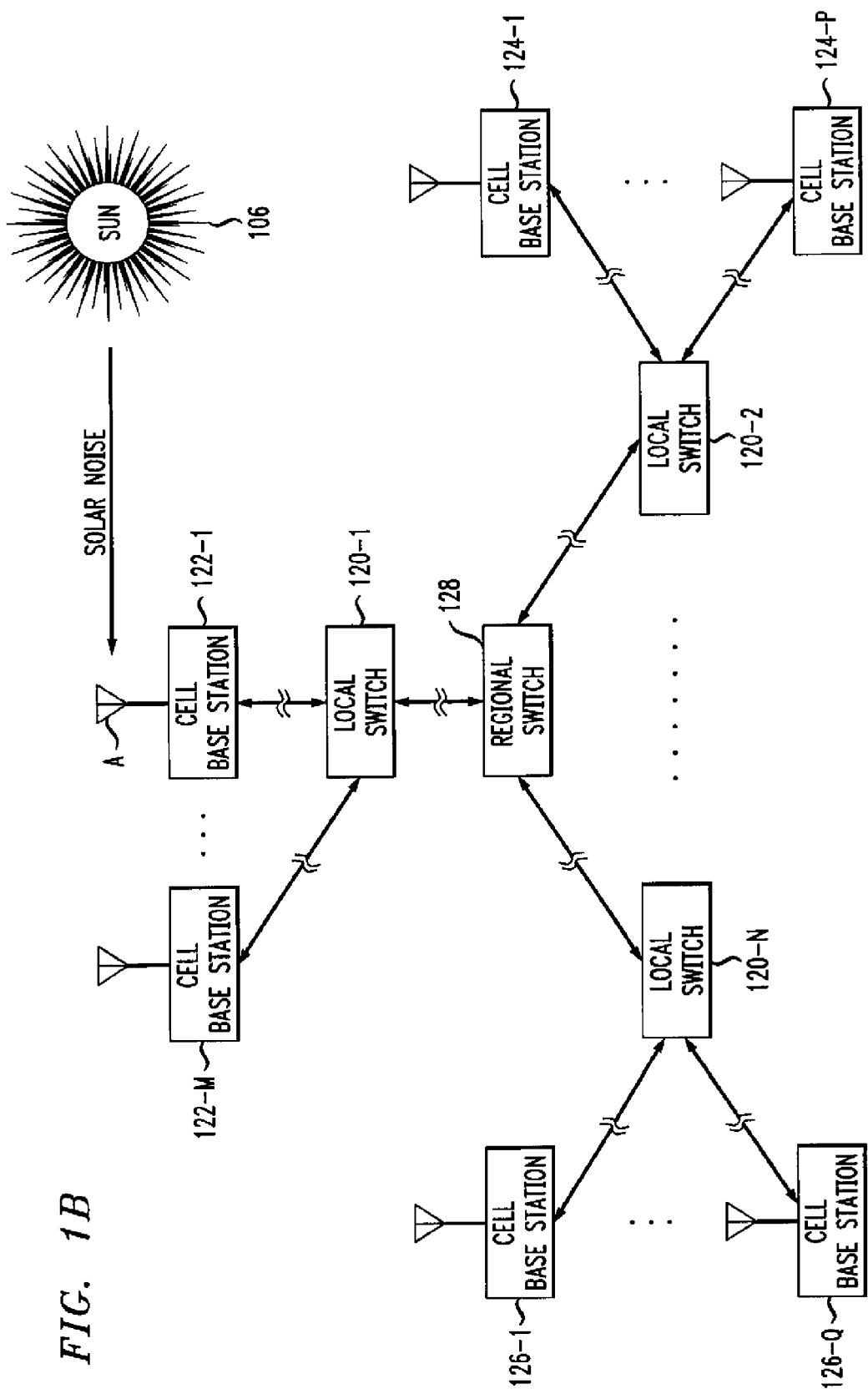
FIG. 1B is a block diagram illustrating a wireless communication system in which a solar activity alert system of the invention may operate.

Referring now to FIG. 1B, a block diagram illustrates a wireless communication system in which a solar activity alert system and/or methodology of the invention may operate. As will be explained in the context of subsequent figures, a solar activity alert system and/or methodology may be implemented with additional monitoring components coupled to the wireless communication system shown in FIG. 1B and/or by using existing components of the wireless communication system. Of course, it is to be appreciated that the wireless communication system depicted in FIG. 1B is merely illustrative of a communication system in which the present invention may be implemented. It is to be understood that the communication system may include voice and/or data transfer capabilities. As shown, the wireless communication system may be configured to include a plurality of local switches 120-1, . . . , 120-N, a plurality of base stations 122-1, . . . , 122-M, 124-1, . . . , 124-P, 126-1, . . . , 126-Q, respectively associated with each local switch, and a regional switch 128. For the sake of clarity, mobile user stations associated with each base station cell are not shown.

Figure 2:
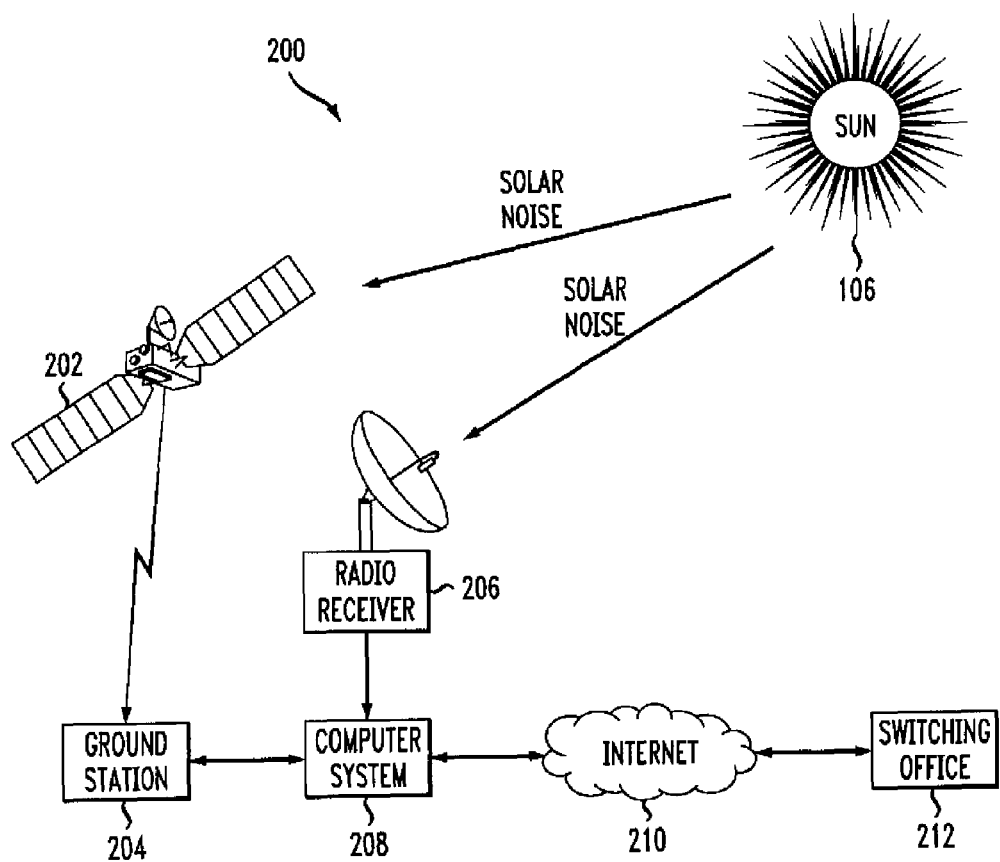
FIG. 2 is a block diagram illustrating a solar activity alert system according to an embodiment of the present invention.

Referring now to FIG. 2, a block diagram illustrates a solar activity alert system according to an embodiment of the present invention. In general, the system 200 obtains information regarding solar noise activity, e.g., the occurrence and magnitude of spike bursts or flares, from one or more information sources and informs users of a wireless communication system that would be affected by such activity of the activity. The sources of data may be, but are not limited to, one or more solar radio antennas; x-ray data from NOAA or National Oceanographic and Atmospheric Administration satellites; other satellites at GEO or Geosynchronous Earth Orbit, or other orbits; optical data from ground and/or space-based instruments, etc. Such data may also be included in solar activity prediction models that may be employed by the solar activity alert system of the invention in order to predict future solar activity.

By way of example, FIG. 2 illustrates the system 200 comprising a satellite 202, a ground station 204, a solar radio antenna and receiver 206, a computer system 208, a network 210 and a switching station 212. With reference back to FIG. 1B, it is to be understood that the switching station 212 may be one of the local switches 120-1, . . . , 120-N or the regional switch 128. Of course, each local switch may be coupled to a respective solar activity alert system 200 as shown in FIG. 2. In this illustrative embodiment, the equipment that is used to gather solar activity data associated with the sun 106 is the satellite 202 and the solar radio antenna and receiver 206. It is to be appreciated that the satellite is preferably instrumented to monitor solar noise and other solar activity from its space-based position. This information is relayed to the ground station 204. The ground station 204 is in communication with the computer system 208. In addition to the space-based solar activity monitoring provided by the satellite 202, a terrestrial-based monitoring sub-system is employed to monitor the solar activity from the ground. This is accomplished by the radio antenna and receiver sub-system 206 which receives solar noise signals and provides them to the computer system 208. Of course, the receiver sub-system may have processing capabilities so that it can process the received solar noise signals and provide information derived therefrom to the computer system. In any case, the computer system may receive processed data, and/or raw data and then process the raw data itself, whereby the processed data represents the solar activity. The computer system may then provide users of the wireless communication system with all or a portion of the information so as to keep them informed of the solar activity and the possibility that severe solar conditions, predicted or currently occurring, may affect system performance and therefore service.

Of course, the information may be provided to other components of the wireless communication system which can then take action to automatically mitigate the effect of the solar activity. Some illustrative methods of automatically mitigating the effect will be described below. In any case, as shown in FIG. 2, the computer system 208 is preferably coupled to a network 210 such that the solar activity information, either provided thereto or generated thereby, may be provided to the switching office 212 of the wireless communication system. It is to be understood that the network may be a public network, such as the Internet, and/or a private network. The type of network is not critical to the invention. The switching office 212 may then pass the information to the base stations in the wireless communication system, e.g., cell base stations 122-1, . . . , 122-M, 124-1, . . . , 124-P, 126-1, . . . , 126-Q in FIG. 1B, which can then take passive measures to mitigate the effect of the solar activity, such as provide a text and/or audio warning message to users on cellular phones within their cells that there may be a problem in performance. A base station can also take active measures to mitigate the effect of the solar activity, such as causing a mobile station to handoff to a less effected cell of the wireless communication system, as well as other processes to be further explained below.

Furthermore, it is to be understood that the computer system 208, as well as the other monitoring components of the system 200, may be alternatively located at the regional switch, any of the local switches, or any of the base stations of the wireless communication system, rather than at a location separate from the wireless communication system components as shown in FIG. 2. An embodiment that illustrates such an alternative arrangement will now be described below in the context of FIG. 3.

Figure 3:
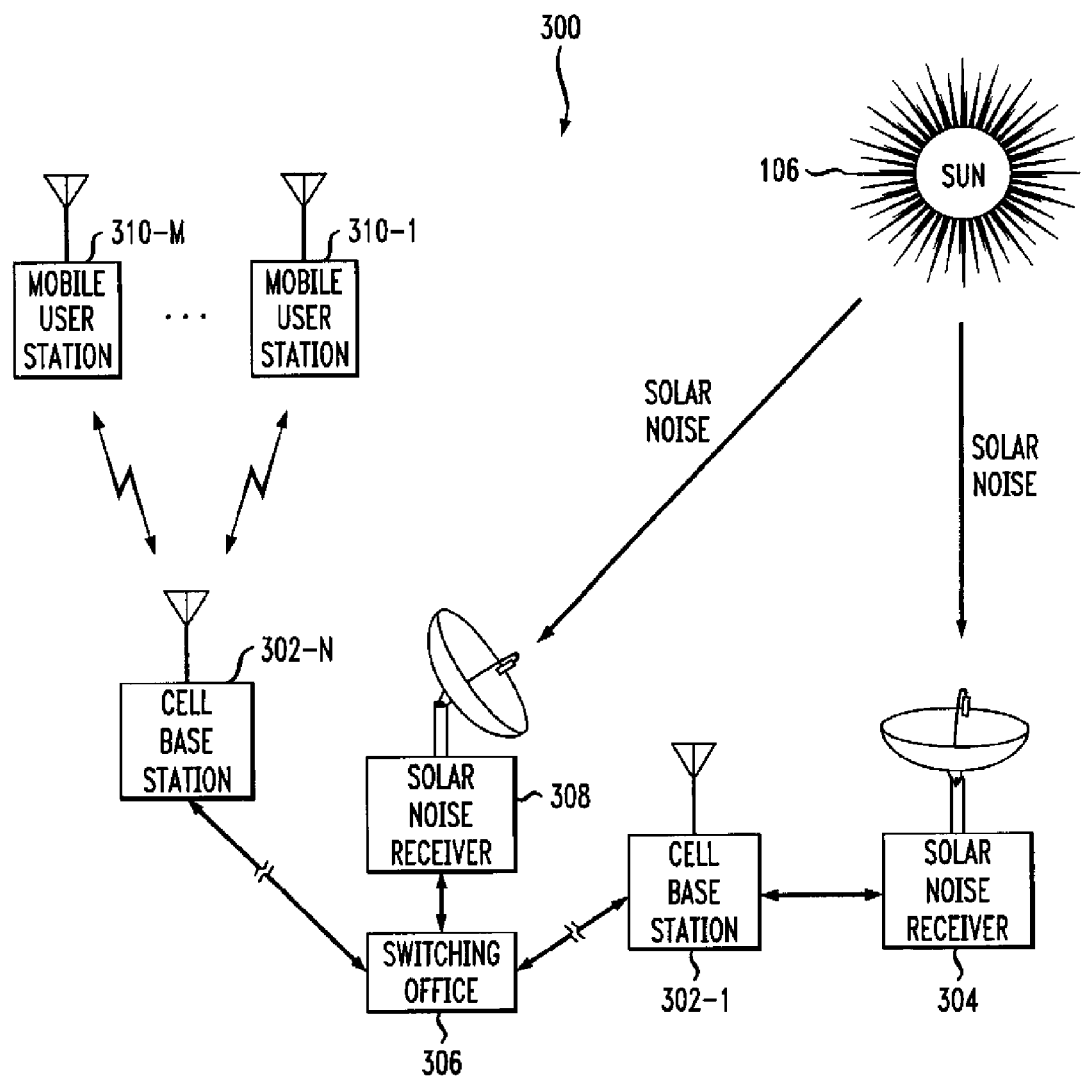
FIG. 3 is a block diagram illustrating a solar activity alert system according to an alternative embodiment of the present invention.

Referring now to FIG. 3, a block diagram illustrates a solar activity alert system according to an alternative embodiment of the present invention. In general, the system 300 may include one or more solar noise radio antenna and receiver sub-systems for obtaining solar activity information. Such sub-systems may be incorporated into base stations of the wireless communication system and/or into a switching office of the communication system. As shown in FIG. 3, the system comprises a plurality of cellular base stations 302-1, . . . , 302-N, a switching office 306, and solar noise antenna and receiver sub-systems 304 and 308. The solar noise antenna and receiver sub-system 304 is directly coupled with the base station 302-1, while the solar noise antenna and receiver sub-system 308 is directly coupled with the switching office 306. In this embodiment, the solar noise antenna and receiver sub-systems 304 and 308 obtain the solar noise signals and provide the solar activity data to the base station 302-1 and the switching office 306, respectively. The information may then be sent to other base stations in the communication system, e.g., base station 302-N such that the effects of the solar noise on mobile user stations 310-1, . . . , 310-M can be mitigated. Of course, base station 302-1 has mobile user stations associated therewith, but they are not shown for the sake of clarity. Also, it is to be appreciated that while FIG. 3 illustrates antenna and receiver sub-systems, for monitoring the solar noise, being associated with a switching office and a base station, the warning system can be implemented in a wide variety of other configurations depending on the architecture of the wireless communication system. For instance, solar activity monitoring could be done solely at the switching office, or at more than one base station. The invention is not intended to be limited to any specific configuration. Still further, it is to be understood that, while not explicitly shown in FIG. 3, the computer system that receives and processes the solar activity data, e.g., block 208 in FIG. 2, may be located at the switching office 306, any of the base stations, or even at a location separate from the wireless communication system components.

Figure 4:
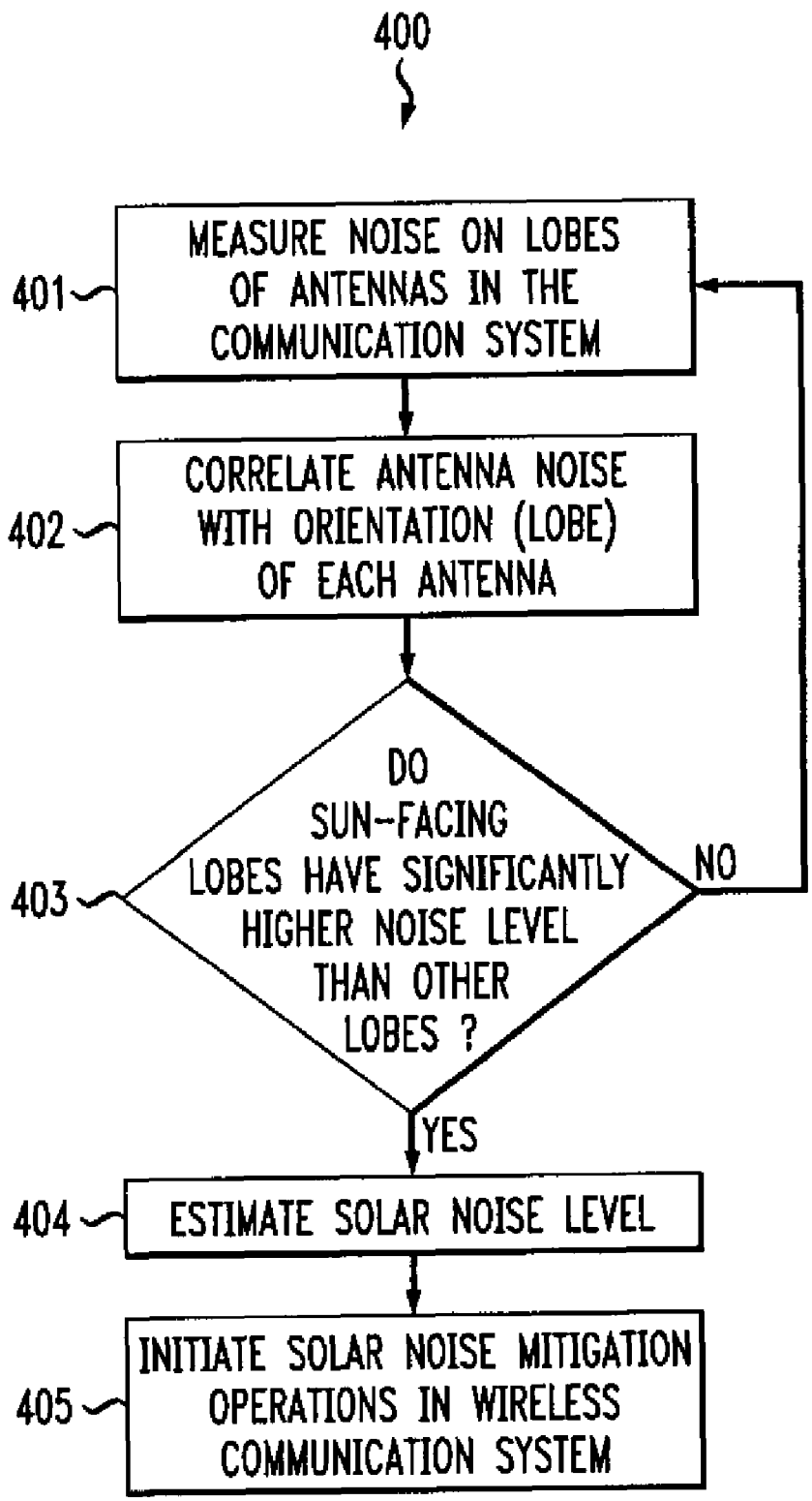
FIG. 4 is a flow diagram illustrating a solar activity alert methodology according to an embodiment of the invention.

Referring now to FIG. 4, a flow diagram illustrates a solar activity alert methodology according to an embodiment of the present invention for use with existing components of a wireless communication system, e.g., such as is illustrated in FIG. 1B. That is, the solar activity alert methodology 400 described in the context of FIG. 4 is an alert system that utilizes the existing components of the wireless communication system in which it is implemented without separate monitoring components, e.g., satellite 202 of FIG. 2, ground station 204 of FIG. 2, solar noise antenna and receiver subsystems 206 of FIGS. 2, 304 and 306 of FIG. 3, etc. It is to be appreciated that the gathering and processing of solar activity information and the initiating of solar noise mitigation operations may be performed in one or more computer systems associated with an existing wireless communication system, e.g., cell base stations 122-1, ..., 122-M, 124-1, ..., 124-P, 126-1, ..., 126-Q, local switches 120-1, ..., 120-N, and/or regional switch 128 of FIG. 1B.

In accordance with solar activity alert methodology 400, the following terms are defined:

$N_i$=measured noise on antenna i;
$\aleph_i$=estimated noise on antenna i;
$N_{sun}$=solar noise;
$R_i(\angle_{sun})$=antenna gain in direction of sun for antenna i; and
$N_{int}$=intrinsic or non-solar noise level on antenna i.

It is to be understood that $N_i$ is composed of amplifier noise plus non-solar sources, including interference from other cell sites.

In accordance with methodology 400, the noise in the lobes on one or more cell sites is measured as indicated in step 401. Thus, with reference again to FIGS. 1A and 1B, the method measures noise, for example, on lobes 110a, 110b and 110c of antennas of cell base stations 122-1, ..., 122-M, 124-1, ..., 124-P, 126-1, ..., 126-Q. Preferably, a number of cell base station sites are used, e.g., ten or more. This corresponds, in present day implementations of sites, to perhaps thirty or more antenna lobes.

In step 402, the method correlates antenna noise with the orientation of each antenna. That is, the noise from the lobes is analyzed in terms of antenna orientation, e.g., the noise in lobe 110a versus the noise in lobes 110b and 110c in FIG. 1A. Next, in step 403, the method determines whether the lobes that are facing the sun have a significantly higher noise level than other lobes. If no, then the method returns to step 401 and resumes measuring noise on the lobes. If the method determines that the set of sun-facing antenna lobes have significantly higher noise levels than do the other antenna lobes, the solar noise level is estimated on each of those antennas in step 404.

Once the solar noise level is estimated, the method initiates one or more solar noise mitigation operations, in step 405, to reduce and/or eliminate the effects of the solar noise. The mitigation operation that is initiated at each base station depends on the level of estimated solar noise and characteristics associated with the cell site. Several examples of mitigating operations will be described below in the context of subsequent figures.

The procedure associated with steps 402 through 404 can be addressed, for example, by fitting:

$$\aleph_i = N_{sun} R_i(\angle_{sun}) + N_{int}$$

to the noise measurements by minimizing the function:

$$\Sigma_i (N_i - \aleph_i)^2.$$

Alternatively, estimators for $N_{sun}$ can be derived from principles described in P. Huber, "Robust Statistics," John Wiley and Sons, 1981, the disclosure of which is incorporated by reference herein. Such robust estimators are preferred, as they are less sensitive to noise sources that influence only one antenna. To provide a robust estimate for $N_{sun}$, a different function is minimized:

$$\Sigma_i \phi(N_i - \aleph_i),$$

where $$\phi(x) \text{ equals } \sqrt{1 + \left(\frac{x}{c}\right)^2},$$

with c chosen by experiment, typically 0.5 to 5 times the normal system noise level. Other suitable functions for $\phi(x)$ are described in P. Huber, "Robust Statistics." In any case, this provides an estimate for $N_{sun}$, the solar radio noise. It is also important to calculate uncertainties in the noise determinations, which become large when $R_i(\angle_{sun})$ is small for all antennas, e.g., which occurs near local noon hours. The techniques described in D. Besley et al., "Regression Diagnostics," pp. 22-24, John Wiley and Sons, 1980, the disclosure of which is incorporated by reference herein, can be used to derive an error estimate for $N_{sun}$.

Denoting the error estimate by $\Sigma_t$, the wireless communication system will respond to increased solar noise by implementing one or more solar noise mitigation operations, to be described in detail below, when:

$$N_{sun}/\sigma > K$$

K is best determined by operational experience depending on the system. Typically, K may lie between about three and ten, if ten or more cell sites are used in the fit.

Figure 5:
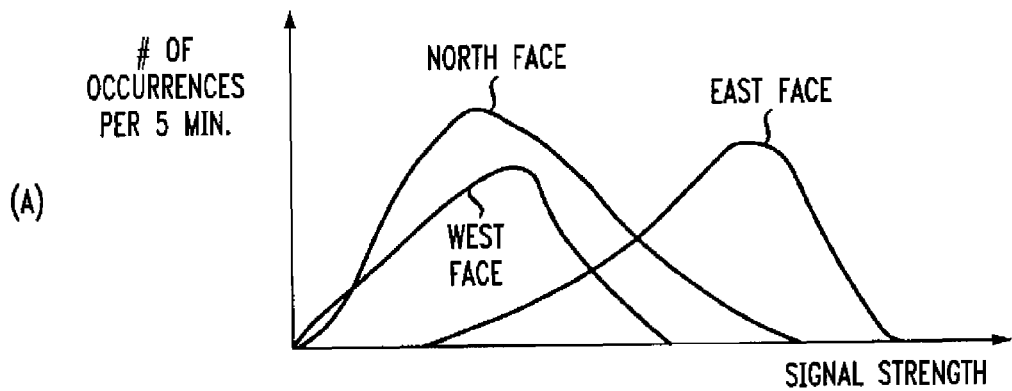
FIGS. 5A through 5C are graphical representations illustrating the effects of solar noise bursts as a function of antenna face and time-of-day as measured signal strength.
Figure 5:
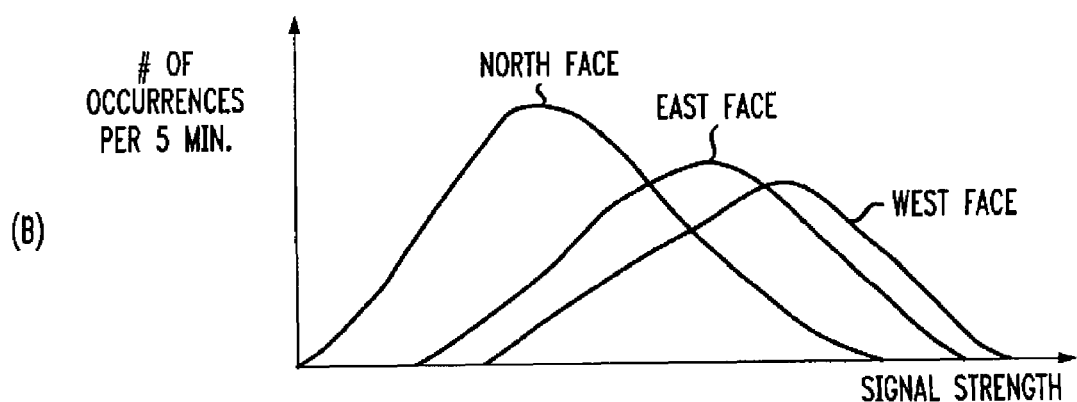
Figure 5:
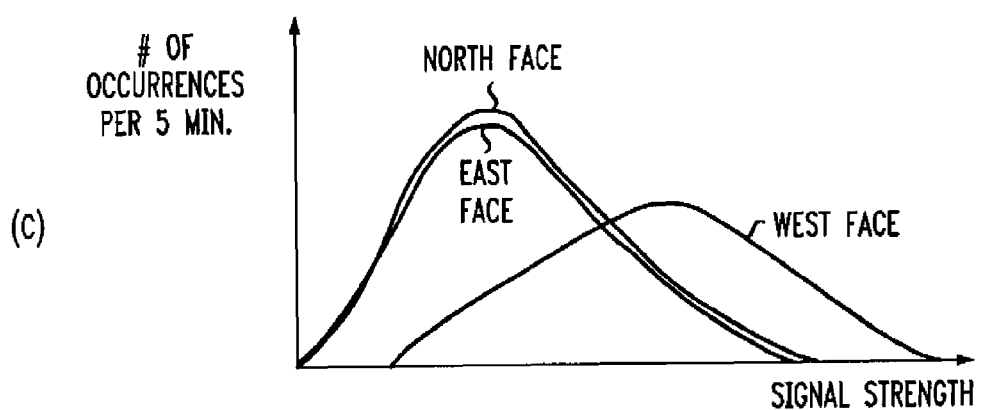

Referring now to FIGS. 5A through 5C, conceptual histograms of noise power as a function of time-of-day and antenna face are illustrated. The faces represented are "North," near 0 degrees; "East," 120 degrees; and "West" at 240 degrees. Specifically, FIGS. 5A, 5B and 5C show noise power distributions during a solar flare shortly after dawn, near noon, and before sunset, respectively. Note that dawn and dusk are more severe than noon as the sun is close to being in the main beam of the antenna whereas, around noon, it is attenuated by the lower antenna sensitivity. Also, in the case of a wireless communication system with an extra-terrestrial component such as a spacecraft, similar distributions of noise power would be obtained depending on whether the sun is near the line-of-sight of the spacecraft. Estimates of signal strength may be made with various well-known statistical estimates. A mid-mean may be a good choice between efficiency and robustness. The estimate should preferably be robust as such measurements are often contaminated by other sources of radio frequency energy.

The following detailed description will explain several examples of solar noise mitigation operations that may be initiated by a solar activity alert system of the invention in the wireless communication system to reduce and/or eliminate the effects of the solar noise. It is to be understood that one or more of the following mitigation operations may be implemented in a solar activity alert system employing separate monitoring components, e.g., FIGS. 2 and 3, or a solar activity alert system employing existing components of the wireless communication system to perform monitoring, e.g., FIG. 4.

As explained above, if the solar activity is determined to be severe or otherwise greater than or equal to some predetermined level, the alert system of the invention may implement one or more procedures to mitigate the effects of the solar interference. Also, note that one or more of the following procedures may also be employed even if the noise is determined to be a local source of noise.

Figure 6A:
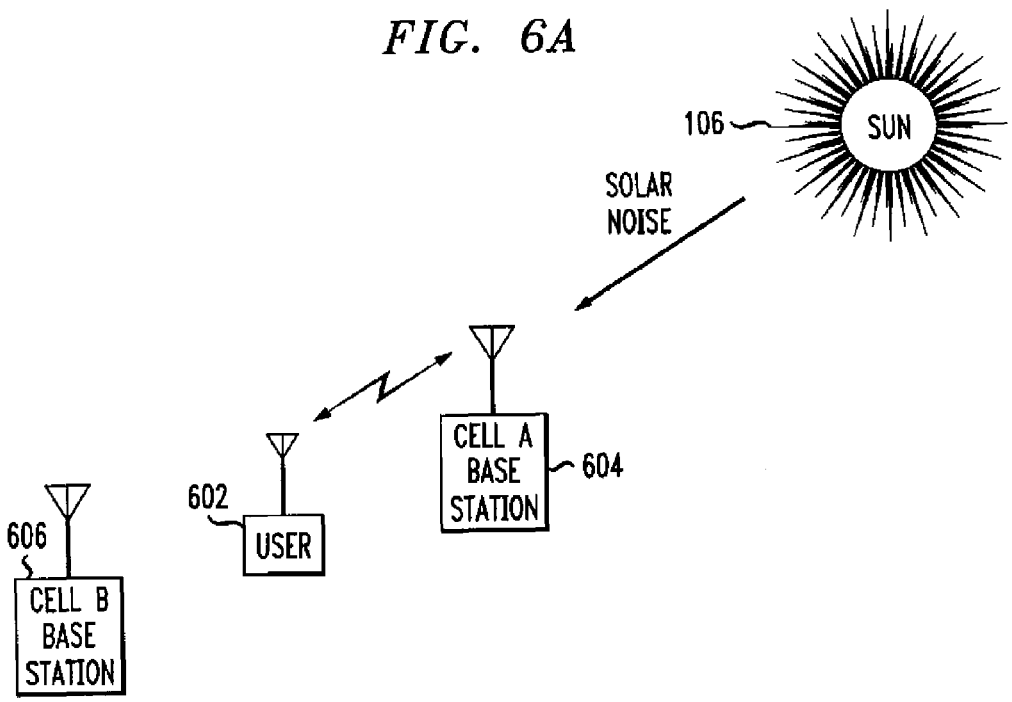
FIGS. 6A and 6B are block diagrams illustrating a simple example of mobile handoff according to the invention.
Figure 6B:
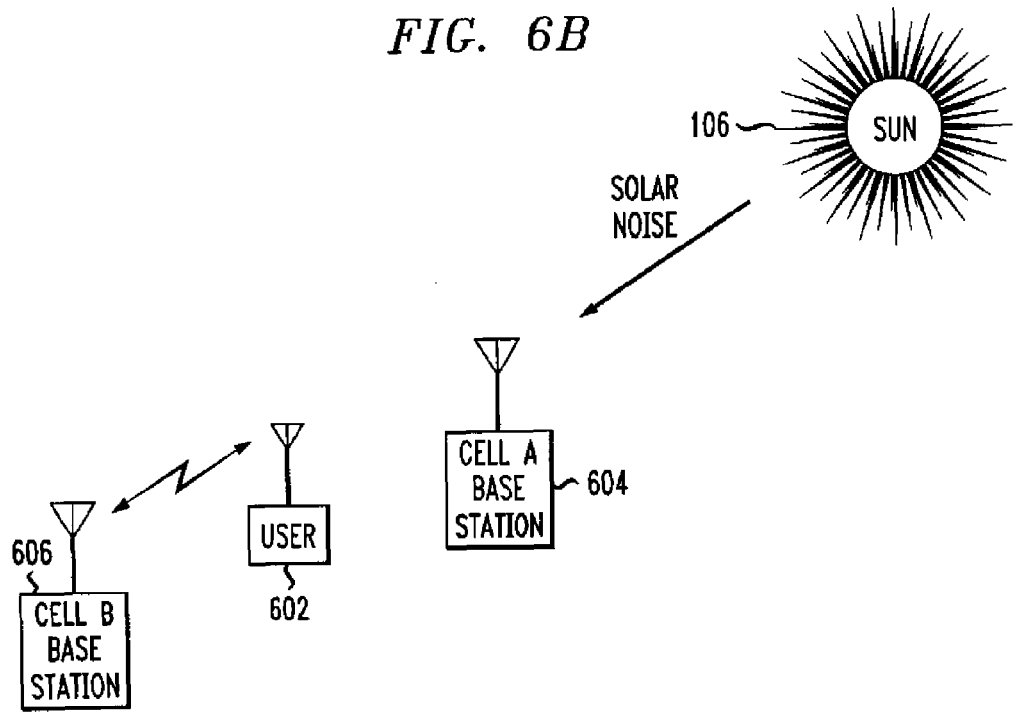

A first mitigating operation is illustrated in FIGS. 6A and 6B. These figures illustrate a simple example of mobile handoff according to the invention. As shown in FIG. 6A, a mobile user station is in communication with a base station 604 in cell A. There is, however, a severe incident of noise interference originating from a solar source such as a flare or other activity. Thus, as shown in FIG. 6B, upon instruction from the solar activity alert system of the invention, for example, a computer system at the regional switch, the communication system effectuates a handoff of mobile user 602 from the base station 604 of cell A to a base station 606 of cell B, cell B not being affected by the solar interference due, for instance, to the fact that its antenna is not facing the sun.

Another method of mitigating the effect of the solar noise at a base station according to the invention is as follows. If solar activity is determined to be severe with respect to a given base station, the alert system in the form of, for example, a computer system at the regional switch instructs the base station to tolerate a higher frame error rate on sun-facing sectors. That is, the base station is instructed not to request an increase of the transmit power of mobiles in an affected sector of the base station cell during the period of high solar activity. As mentioned above, with the conventional power control algorithm, the base station treats each user independently and, based on an increase in the frame error rate for each user, the base station would request the individually affected users to increase their transmit power. This correspondingly would increase the interference to neighboring cells. They in turn would request the users in those sectors to increase their transmit powers. In this way, the system interference across the network would increase. However, in accordance with the invention, by instructing the base stations with sun-facing antennas to tolerate a higher frame error rate, this chain reaction of increased transmit power would not occur thereby not causing significant wireless communication service degradation. Of course, some degradation may still occur directly due to the solar interference.

Yet another method of mitigating the effect of the solar noise at a base station according to the invention is as follows. If solar activity is determined to be severe with respect to a given base station and antenna, the alert system in the form of, for example, a computer system at the regional switch instructs the base station to request that mobile user stations participating in existing calls reduce their respective transmit power levels. It is to be understood that solar noise can be a problem for one antenna on a base station, but may not affect some other antenna. Users of the affected base stations/antennas would suffer, but other users would maintain their quality of service.

A further method of mitigating the effect of the solar noise at a base station according to the invention is as follows. If solar activity is determined to be severe with respect to a given base station, the alert system in the form of, for example, a computer system at the regional switch instructs the base station to lengthen the dropped call timeout value so as to allow a user a longer period of time to move to area or cell having better propagation, i.e., one less effected or not effected by the solar noise.

Figure 7:
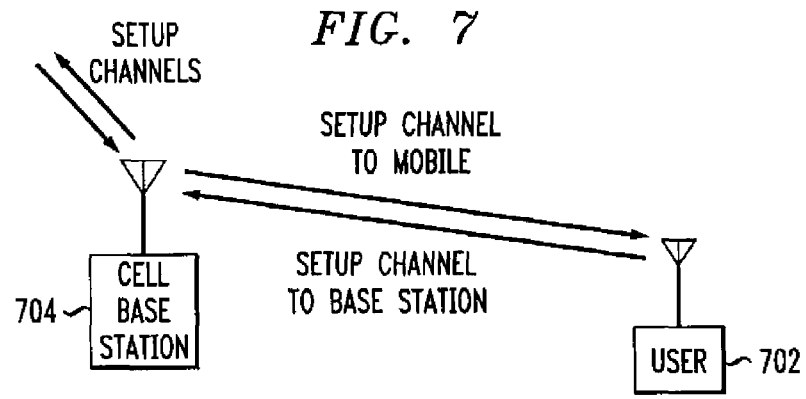
FIG. 7 is a block diagram illustrating the concept of setup channels between a base station and a mobile user station.

Still a further mechanism for mitigating the effect of solar noise in accordance with the invention includes reducing the number of mobile users served by a sun-facing antenna by allowing fewer call initiations via that antenna. Typically, there are many setup channels in a region. This is illustrated in FIG. 7, where a mobile user station 702 utilizes the setup channels to and from a base station 704 to initiate a call. However, other mobiles may utilize other setup channels associated with the base station 704. In normal operation, a cell phone scans through the assigned set of setup channels, measures the signal on each, then communicates with whatever antenna or channel gives the largest signal.

In the presence of external noise on a given face, e.g., solar noise, but not limited to solar noise, the base station can be instructed by the alert system to reduce the power the base station transmits on the setup channel. This will restrict that face's coverage area to a small area near the antenna. The user will then likely connect via a different antenna. Another option is to boost the power on the setup channels that do not face the sun. This will also make it more likely that the mobile unit will connect to an antenna face that doesn't suffer from interference.

Another method of mitigating the effect of solar noise in accordance with the invention is to modify the handoff algorithm of the wireless communication system to take into account the solar activity. In accordance with the invention, handoffs are preferably controlled on the basis of signal to noise level, rather than just on the basis of signal strength, as is common practice. While techniques for measuring signal strength are known to those of ordinary skill in the art, e.g., algorithms implemented in Advanced Mobile Phone Service or AMPS systems, existing systems do not make noise measurements. A reliable noise measurement involves measuring the power on a channel, time-slot, or code without traffic. One can get information on which channels/time-slots/codes are unused by asking the local switch, e.g., local switch 302 of FIG. 3. Power can then be measured on those channels multiple times, and a median or similar algorithm may be used to combine the measurements. The local switch may be programmed to allow a noise measurement in each 5 MHZ band, and at least as often as one measurement in each band every two seconds. It should be understood that the frequency band discussed here is merely an example, i.e., the noise mitigation method may be used in other systems.

Also, as an alternative solar noise mitigation method of the invention, when the system determines that noise in a given geographical location is too high for reliable operation, the system can send a broadcast text message over the appropriate setup channels. This text message can announce interference problems and warn users that service will be limited. The message could also refer them to an Internet URL or Uniform Resource Locator for further information.

Figure 8:
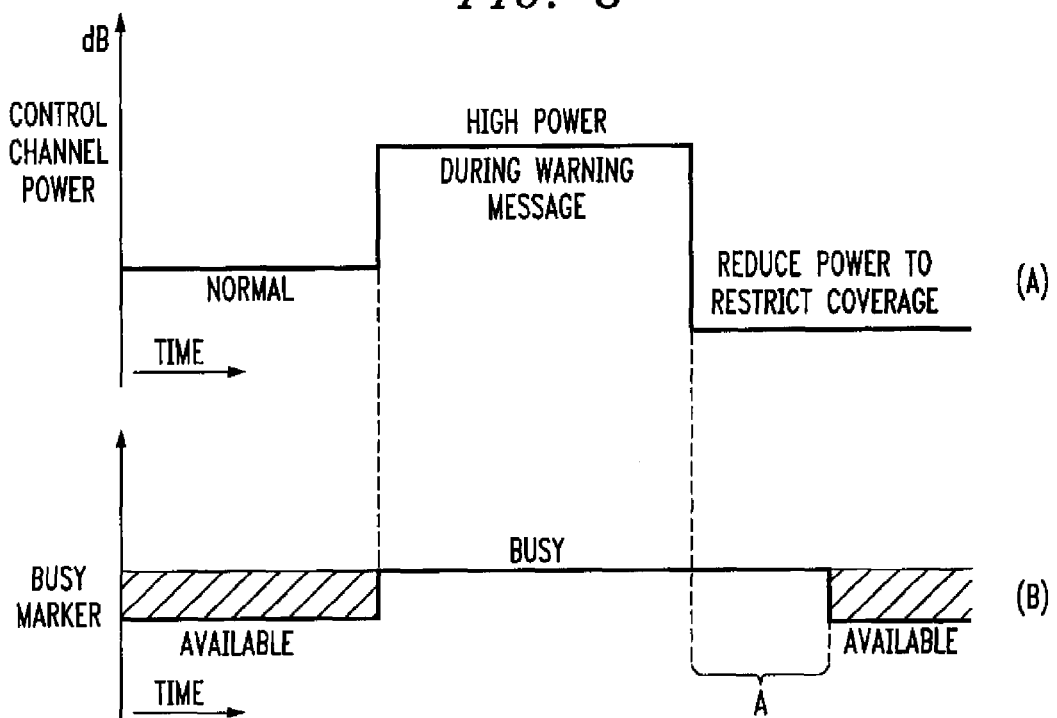
FIGS. 8A and 8B are graphical representations illustrating power adjustment of a control channel as a function of solar activity according to the invention.

Alternatively, the system could briefly put more than the normal amount of power into the control channel to accomplish the broadcast transmission. Simultaneously, the control channel may be marked busy by transmitting an appropriate bit pattern. This is illustrated in FIGS. 8A and 8B. Specifically, FIG. 8A illustrates control channel power as a function of time, while FIG. 8B illustrates a busy marker signal as a function of time. As shown, the control channel power is high during the warning message. The service message may state that service is poor due to sunspot activity. At the same time, the base station keeps its busy marker signal high so as to prevent mobile stations from attempting to place new calls or re-establish calls. The busy marker is also preferably kept high for a time period A after the control channel power is reduced to restrict coverage so as to allow time for a mobile station to re-estimate signal strength before attempting to place another call and so as to allow other mobile stations to become aware that the signal strength of the control channel has dropped.

In situations where the direction to the noise source can be precisely determined, e.g., the sun, one particularly effective response to the noise involves minimizing the antenna gain in the direction of the noise source. This is referred to as beam nulling.

In accordance with the invention, the antenna and/or base station is constructed so that the relative gain and phase of the signals coming from the various elements of the antenna can be adjusted. The adjusted signals are then added and sent to the receiver. Such techniques are known to those ordinarily skilled in the art and are taught in, e.g., U.S. Pat. No. 5,940,033; M. Wennström et al., IEEE Transactions on Aerospace and Elect. Sys., 36(2), April 2000; O. L. Frost, Proc. IEEE 60, pp. 926-935, August 1972; and S. P. Applebaum et al., IEEE Trans. on Antennas and Propagation, v.24, pp. 650-662, September 1976, the disclosures of which are incorporated by reference herein.

Such a system could reduce the gain in the direction of the sun by 10 dB, while leaving the antenna pattern largely unaffected at angles more than 30° from the sun. The gain adjustment makes the base station receiver insensitive to all but the largest flares, while maintaining normal communication with the majority of the mobile units.

Such a system requires precise knowledge of the phase and attenuation in cables, amplifiers and antennas. Birds and dirt on antennas, water in cables, and aging of electronic components can disturb the electrical properties enough to prevent the system from nulling out a noise source.

Advantageously, the system may measure relative phases and gains by adaptively nulling out signals from other nearby base stations. The other base stations have precisely known positions, and are often, except in certain extremely urban areas, in line-of-sight of each other, allowing the direction of the incoming waves to be accurately modeled, thus allowing an accurate measurement of the relevant electrical properties. Adaptive nulling techniques are known to those ordinarily skilled in the art, e.g., the above-referenced U.S. Pat. No. 5,940,033; M. Wennström et al., IEEE Transactions on Aerospace and Elect. Sys., 36(2), April 2000; O. L. Frost, Proc. IEEE 60, pp. 926-935, August 1972; and S. P. Applebaum et al., IEEE Trans. on Antennas and Propagation, v.24, pp. 650-662, September 1976.

Figure 9:
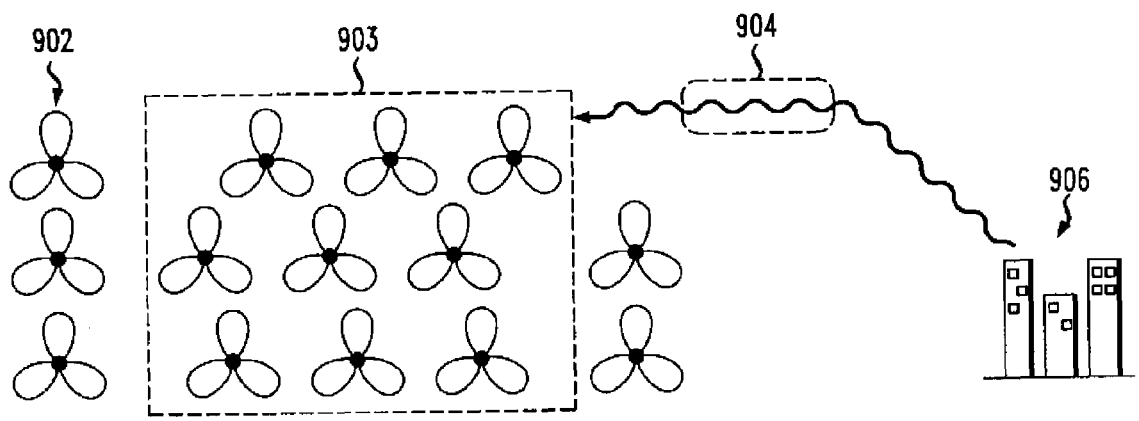
FIG. 9 is a block diagram for illustrating a method of mitigating effects of a noise source according to an embodiment of the invention.

Referring now to FIG. 9, a wireless communication system near a noise source is illustrated. While the noise source is shown as tropospherically ducted noise from an urban area, it could well be solar noise. The communication system includes an array of cell site base stations 902. All of the stations in a patch 903 are assumed to receive signals through a tropospheric duct 904, from approximately the same direction. The noise source 906, as shown, is an urban area. It is to be understood that techniques that can be applied to identify and respond to noise bursts from the sun can also be applied to other sources. Two substantial modifications are normally needed: (1) the algorithm must search over all possible directions and/or locations of the noise source; and (2) the algorithm may search for a cluster of nearby base stations that have similar noise properties. We give several examples of appropriate algorithms below. Again, it is to be understood that the algorithms can be executed in accordance with one or more computer systems associated with the solar activity alert system and/or the wireless communication system.

Following FIG. 4, we assume a set of fictitious positions for the sun. Here, in this embodiment, it is to be understood that "sun" could also refer to any other characteristically similar noise source that affects a group of base stations. For systems where tropospheric ducting is a major source of interference or noise, these fictitious positions may be spaced every 20 degrees in azimuth, and at elevation angles of 0°-10° in steps of 1°. Here, we assume a typical 120° wide by 5° tall beam. The density of the grid increases if the beam sizes shrink so as to maintain 1-30 grid points in each antenna beam. Then, the algorithm defines a set of compact clusters of base stations.

Exemplarily, a cluster could be defined as "all base stations located within 10 kilometers of base station X." An example of a cluster may be patch 903. However, it may be advantageous to adapt the size and shape of clusters to the noise source. Advantageously, for non-circular clusters, the orientation of the cluster is defined relative to the fictitious position of the sun that is under consideration.

Finally, $N_{sun}/<\sigma>$ is calculated for each cluster, at each fictitious sun position, where $N_{sun}$ is the estimate of the noise power coming from the sun and $<\sigma>$ is the uncertainty in the measurement. The (cluster, position) pair that leads to the most significant or largest $N_{sun}/<\sigma>$ ratio is considered to define the direction and area of coverage of the noise source. As in the methodology of FIG. 4, the ratio is compared to K to determine whether the noise is significantly above normal. Appropriate values of K will be larger, typically 4>K>30, and best determined by experiment for a particular system.

Figure 10:
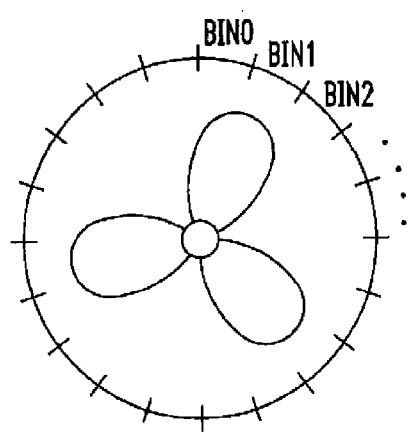
FIG. 10 is a block diagram for illustrating a method of mitigating effects of a noise source according to another embodiment of the invention.

A second algorithm may be employed. Following the descriptions above in the context of FIG. 9, the algorithm first identifies antennas that have unusually high noise levels. Then, the algorithm finds clusters of antennas with unusually high noise from similar directions as follows. First, as illustrated in FIG. 10, angular bins such as Bin0, Bin1, Bin2, etc., are established with a size several times, e.g., 2-10×, smaller than the azimuthal width of a typical antenna's beam pattern. Each set of bins is associated with the location of a cell base station. Each base station has an identical set of angular bins.

Then, for each antenna that has unusually large noise, the algorithm marks those angular bins where the gain of the antenna is within a factor η of the antenna's maximum gain, typically, 0.1<η<0.71. Next, the algorithm establishes a set of potential clusters of cell base stations, following the description of FIG. 9 above. Then, for each potential cluster, and for each angular orientation, the algorithm sums the number of base stations in the cluster that have the corresponding angular bin marked. Next, the algorithm defines and calculates a figure of merit for an arbitrary cluster at a particular angular orientation. Normally, the figure of merit is a function of the sum and the number of members in the cluster. An example figure of merit may be F sum/number-of-members. Finally, the algorithm selects the combination(s) of (cluster, angular direction) pairs that maximizes the figure of merit. This combination is taken to define the area of coverage of the noise and its direction.

In a variant of this algorithm, the algorithm marks the angular bins with a variable magnitude, not just 0 or 1, as in the above algorithm. The magnitude of a mark could be set by the degree to which each antenna's noise measurement is unusual, along with the antenna gain in the direction under consideration.

In any of the above algorithms, once a cluster is selected, all of the base stations in the cluster are considered to be affected by the noise source, and are treated similarly in response to the noise.

It is to be appreciated that while a number of illustrative examples of methods of mitigating the effects of solar activity and other sources of noise in accordance with a wireless communication system are discussed above, other mechanisms may be employed. Also, a solar activity alert system according to the invention may implement one or more of the methodologies described herein.

Figure 11:
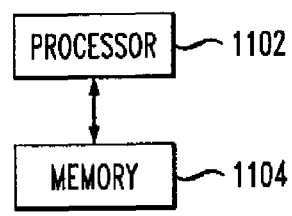
FIG. 11 is a block diagram illustrating a hardware implementation of one or more components of the solar activity alert system of the present invention.

Referring now to FIG. 11, a block diagram illustrates a hardware implementation of one or more components of the solar activity alert system of the present invention. For example, the hardware implementation shown in FIG. 11 may be employed in the computer system 208, and/or in any of the base stations, mobile user stations, local switches, regional switches, switching offices and other components described herein. As shown, the implementation includes a processor 1102 coupled to memory 1104. It should be understood that the term "processor" as used herein is intended to include one or more processing devices, including a central processing unit, CPU, or other processing circuitry. Also, the term "memory" as used herein is intended to include memory associated with a processor or CPU, such as RAM, ROM, a fixed memory device, e.g., hard drive, or a removable memory device, e.g., diskette. In addition, the processing unit may include one or more input devices, e.g., keypad or keyboard, for inputting data to the processing unit, as well as one or more output devices, e.g., CRT display, for providing results associated with the processing unit. Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of at least reducing an effect of solar noise on a wireless communication system, the method comprising the steps of:
   measuring solar noise substantially concurrent with one or more solar bursts that may affect one or more components of the wireless communication system; and
   performing at least one operation, as a function of the measured solar noise, to at least reduce the effect of the solar noise at one or more of the components of the wireless communication system that are determined to be affected by the solar noise.

2. Apparatus for at least reducing an effect of solar noise on a wireless communication system, the apparatus comprising:
   a memory; and
   at least one processor coupled to the memory and operative to: (i) measure solar noise substantially concurrent with one or more solar bursts that may affect one or more components of the wireless communication system; and (ii) initiate at least one operation, as a function of the measured solar noise, to at least reduce the effect of the solar noise at one or more of the components of the wireless communication system that are determined to be affected by the solar noise.

3. A method of at least mitigating an effect of noise on a wireless communication system, the method comprising the steps of:
   receiving a noise signal attributable to an interference source characteristic of a point source that may affect one or more components of the wireless communication system;
   measuring a noise level associated with the received noise signal; and
   operating the wireless communication system, as a function of the measured noise level, to at least mitigate the effect of the noise.

4. Apparatus for at least mitigating an effect of noise on a wireless communication system, the apparatus comprising:
   means for receiving a noise signal attributable to an interference source characteristic of a point source that may affect one or more components of the wireless communication system;
   measuring a noise level associated with the received noise signal; and
   means for operating the wireless communication system, as a function of the measured noise level, to at least mitigate the effect of the noise.

* * * * *